April 28, 1942.                M. RUGGIERI                2,281,515
                           SECONDARY SERVICE BOX
               Filed April 8, 1940           3 Sheets-Sheet 1
Fig. 1
Fig. 2
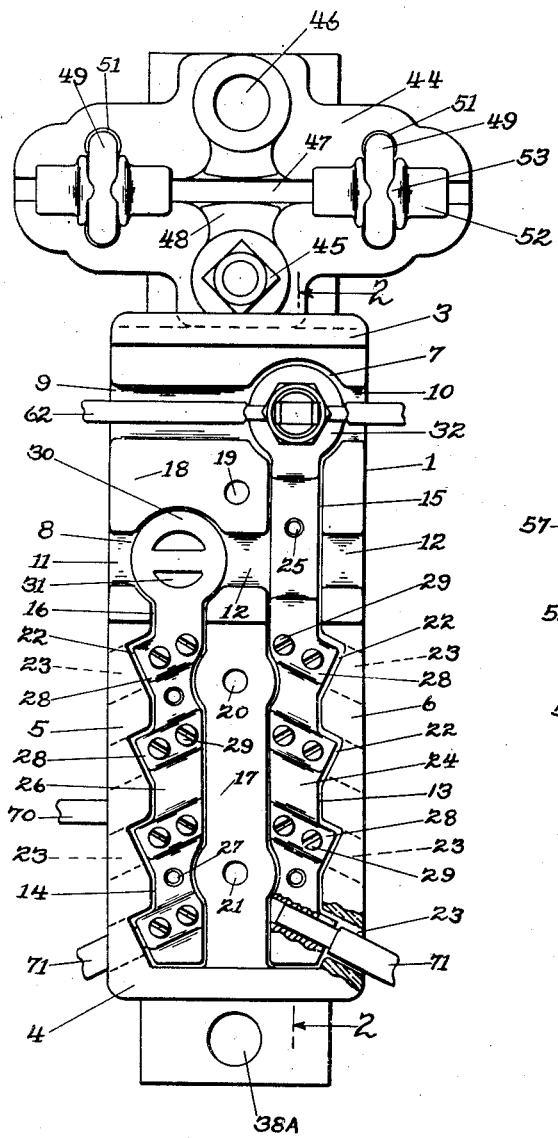
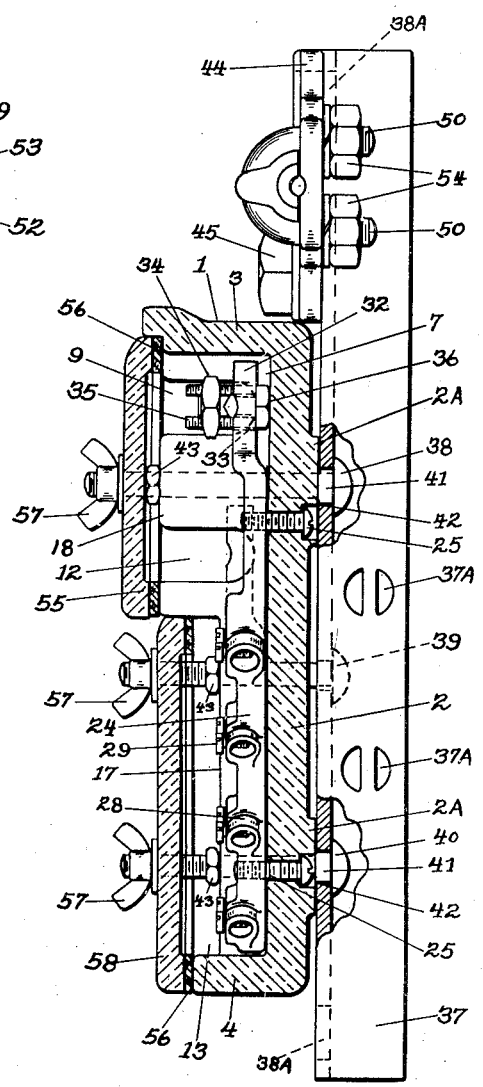
INVENTOR.
Michael Ruggieri
Chester W. Brown
        ATTORNEY.

April 28, 1942.                M. RUGGIERI                2,281,515
                            SECONDARY SERVICE BOX
                    Filed April 8, 1940            3 Sheets-Sheet 2

INVENTOR.
Michael Ruggieri
BY Chester W. Brown
ATTORNEY.

April 28, 1942.   M. RUGGIERI   2,281,515
SECONDARY SERVICE BOX
Filed April 8, 1940    3 Sheets-Sheet 3
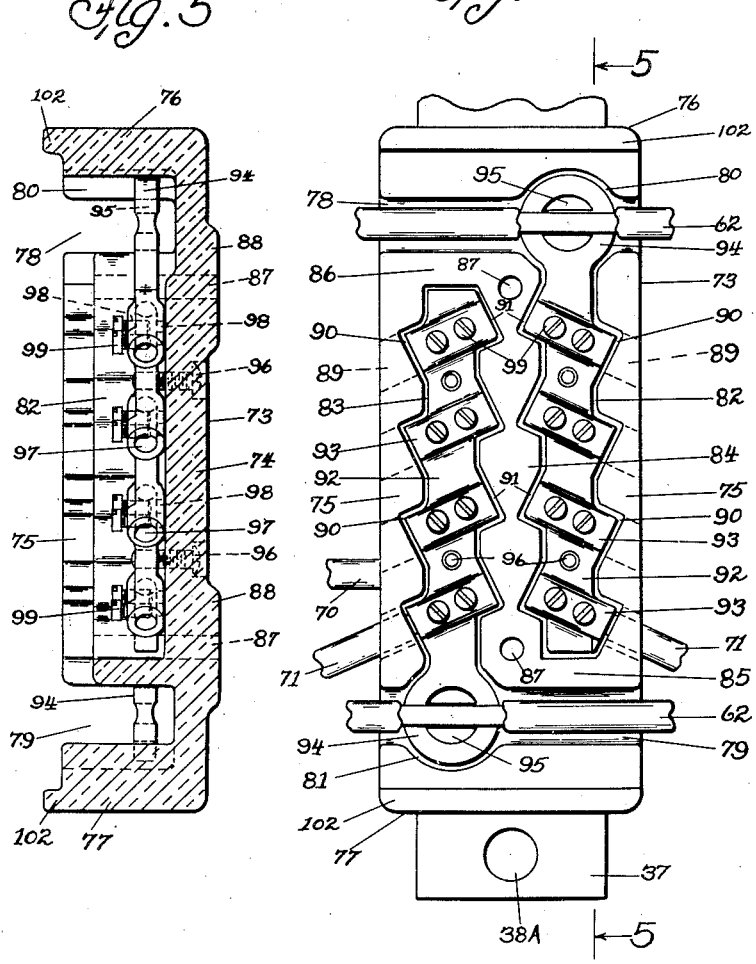
INVENTOR.
Michael Ruggieri
BY Chester W. Brown
ATTORNEY.

Patented Apr. 28, 1942

2,281,515

UNITED STATES PATENT OFFICE 2,281,515

SECONDARY SERVICE BOX

Michael Ruggieri, Stroudsburg, Pa., assignor to Line Material Company, South Milwaukee, Wis., a corporation of Delaware Application April 8, 1940, Serial No. 328,505

10 Claims. (Cl. 174—59)

This invention relates to secondary service boxes.

It is common practice in secondary line construction where a plurality of service drops are required at a single line pole for domestic wiring and other purposes, to provide an elaborate and complicated secondary rack construction which is difficult to install, is unsatisfactory in residential areas because of the unsightly construction, is undesirable electrically because of exposed live parts and interferes with the climbing space on the pole.

It is particularly difficult to provide such service drops on a messenger wire type of secondary line construction because crossarms are generally required in addition to the elaborate and complicated rack construction needed, thereby increasing the cost of such installation.

Therefore, it is an object of this invention to provide for secondary transmission lines a simple, compact service box to which secondary conductors and a plurality of service drops may be connected in such a manner that all conductor connections may be made independently of the other and all live connecting parts are housed against direct weathering and mechanical damage, and to provide an electrically safe construction.

Another object is to provide for secondary transmission lines a service box comprising an insulating housing including removable cover portions and a plurality of compartments and conductor openings, and a pair of bus bars disposed in corresponding compartments and having a plurality of electrically interrelated terminal portions each adjacent a corresponding opening whereby conductor members extending through the openings may be connected in desirable electrical relationship within the housing thereby providing an electrically safe and compact construction which is simple, economical to manufacture, efficient and easy to use.

Still another object is to provide for a service box a unitary bus bar comprising a plurality of apertured terminal portions and a slotted conductive means in electrical relationship with each terminal portion, the slotted means being adapted to hold a bifurcated bolt whereby the intermediate portion of a line conductor may be connected in electrical relationship with the conductive means without the necessity of severing the line conductor.

A further object is to provide for a grounded messenger wire type of secondary line construction, a channel support comprising a messenger wire gripping means in grounded relationship with the channel support and a plurality of slotted portions each adapted to receive a bifurcated bolt whereby one wire of a three wire service drop may be grounded thereto, and a pair of channel bolts adapted to hold the channel support in operating position relative to the secondary transmission line, one of the bolts being provided with means for supporting a primary messenger cable, and a service box substantially as hereinbefore described mounted on the channel support and operating to provide a plurality of service drop terminals in a facile efficient and economical manner.

A still further object is to provide a secondary service box including a housing having independently related terminal compartments communicable with the exterior of the housing through a plurality of apertures and extending into a conductor channel adjacent one end of the housing and an interchangeable terminal means disposable in either of the compartments.

In the drawings:

Fig. 1 is a vertical plan view partly in section of a secondary service box with parts removed.

Fig. 2 is a view in side elevation partly in section of the secondary service box shown in Fig. 1 provided with cover portions.

Fig. 4 is a vertical plan view of a modified form of secondary service box with parts removed.

Fig. 5 is a view taken on the line 5—5 of Fig. 4 with parts removed.

Like parts are designated by the same reference numerals throughout the several views.

Figure 3:
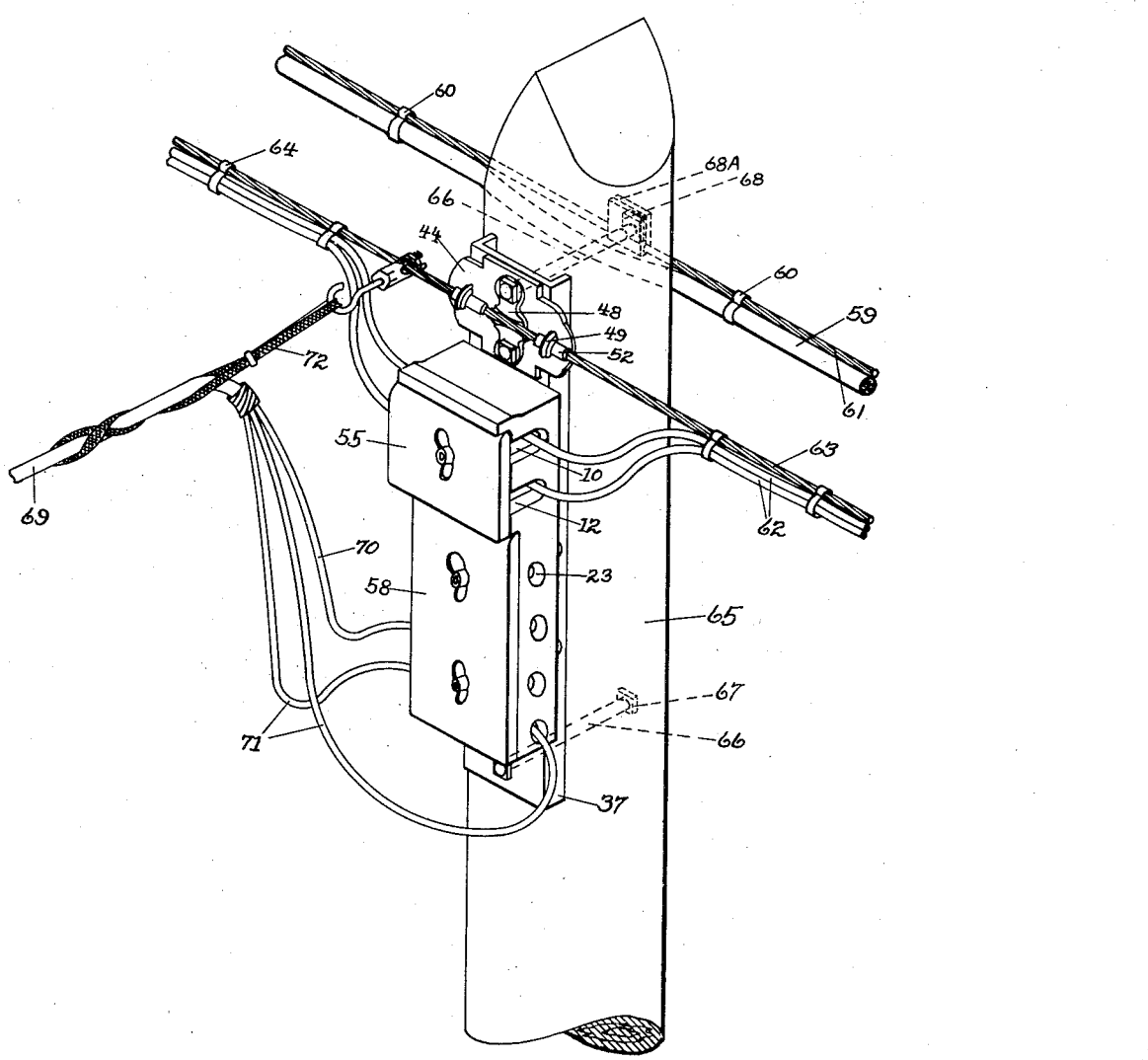
Fig. 3 is a perspective view of the secondary service box mounted on a line pole in operative relation to a messenger wire type of line construction.

Figs. 1 and 2 illustrate a secondary service box comprising a unitary housing 1 molded preferably of porcelain or any other suitable insulating material and having a wall member 2, provided on the rear surface thereof with spaced bearing surfaces 2A, upper and lower walls 3 and 4 respectively and side walls 5 and 6, each wall being normally related to the wall member 2.

The upper portion of the housing 1 is provided with a pair of cylindrical compartments 7 and 8 diagonally spaced from each other. The upper compartment 7 is provided with axially aligned conductor channels 9 and 10 and the lower compartment 8 is provided with axially aligned conductor channels 11 and 12, the channels 9 and 11, and 10 and 12 providing communication through the side walls 5 and 6 respectively with the exterior of the housing 1.

The lower portion of the housing 1 is provided with a pair of compartments 13 and 14 extending in parallel relationship to each other longitudinally of the housing 1 and communicating at their upper ends with the compartments 7 and 8 by means of the channel portions 15 and 16 respectively. The compartments 13 and 14 are separated from each other by means of the partition 17. The channel 9 and compartment 8 are separated from each other by means of the partition 18. It may be noted that the partitions 17 and 18 are provided with apertures 19, and 20 and 21 respectively, each of which extends through the wall member 2.

The compartments 13 and 14 are each provided with a series of notched portions 22, each extending into the walls 6 and 5 respectively. A conductor aperture 23 extends at an angle upwardly through the corresponding walls 5 and 6 into each notched portion 22 as shown.

An electrically conductive unitary terminal member or bus bar 24 is mounted in the compartments 7 and 13 and channel 15 by means of a pair of screws 25 extending through and countersunk in the wall member 2 and threadedly engaging the bar 24 as shown. A similar bus bar 26 is mounted in the compartments 8 and 14 and the channel 16 by means of the screws 27 in the manner described with reference to the bus bar 24.

Each bus bar 24 and 26 is provided with four apertured conductor terminals 28 each spaced one above the other as shown and provided with a pair of terminal screws 29, the terminals 28 on the bus bars 24 and 26 are disposed in the channels 13 and 14 respectively and each terminal extends into a corresponding notch 22 adjacent to and in alignment with a corresponding conductor aperture 23.

The upper end of the bus bar 26 extends through the channel 16 and terminates in the compartment 8 in the form of a terminal head 30 slotted at 31. The upper end of the bus bar 24 extends through the channel 15 and terminates in the compartment 7 in the form of a terminal head 32 slotted at 33 in the manner described with reference to the terminal head 30. A well known form of bifurcated solderless connector 34 is mounted on the head 32 having its threaded leg portions 35 extending through the slots 33 and held in non-removable relationship with the head 32 against the wall member 2 as shown at 36.

The service box hereinbefore described is mounted on a channel iron 37, apertured adjacent its ends at 38A, by means of bolts 38, 39 and 40 extending through the apertures 19, 20 and 21 respectively in the service box and held against rotation by the squared shank portion 41 received in corresponding squared openings 42 in the channel iron 37. Nuts 43 are threaded on the bolts 38, 39 and 40 and engage with the corresponding partitions 17 and 18 thereby holding the service box in fixed position relative to the channel iron 37.

A cable plate 44 mounted adjacent the upper end of the channel iron 37 by means of a bolt 45 is provided with an upper aperture 46 in axial alignment with the aperture 38A in the channel iron 37 and a longitudinally extending cable groove 47 having its intermediate portion raised at 48. Adjacent each end of the groove 47 is mounted a U-bolt 49 having its threaded leg portion 50 extending through apertures 51 as shown. A clamping jaw 52 mounted between the legs of the U bolt and peened thereto at 53 is drawn into operative relationship with the groove 47 by means of nuts 54 as shown.

Pairs of slotted portions 37A are provided on each side of the channel iron 37 and are adapted to receive holding means of the bifurcated bolt type to which the neutral wire of a three wire service drop may be grounded.

The upper compartments 7 and 8 and corresponding channels are closed by means of a porcelain cover 55 provided centrally thereof with an aperture not shown. The cover 55 provided with a molding of cork 56 or other suitable material, is mounted on the bolt 38 and held against the corresponding walls 3, 5 and 6 by means of the wing nut 57.

The lower compartments 13 and 14 are closed by means of a porcelain cover 58 in the manner described with reference to the cover 55 except that two apertures are provided for holding the cover in place on the corresponding bolts 39 and 40.

It may be noted that the lower portion of the walls 5 and 6 and wall 4 extend less far upwardly from the wall member 2 than does the upper portion of the walls 5 and 6 and wall 3. It may be noted that it is necessary to arrange the walls in this manner in order to house solderless connectors, one of which is shown associated with the terminal head 32.

Fig. 3 shows the service box assembled in operative relationship with the usual messenger wire type of secondary transmission line which line comprises a primary conductor cable 59 suspended by means of clips 60 from a primary messenger wire 61 and a pair of secondary line conductors 62 extending from a distribution transformer, not shown, and suspended from the secondary messenger wire 63 by means of clips 64. It may be noted that the messenger wires 61 and 63 are grounded at any convenient place in the system, generally at the transformer.

The service box is mounted on a line pole 65 by means of through-bolts 66 extending through the apertures 38A in the channel iron 37 and the pole 65 and anchored at the opposite side of the pole with suitable means as nuts 67 and 68. The upper means 68 is provided with a clamping portion 68A which holds the primary messenger wire 61 in suspended relationship to the pole 65.

The secondary messenger wire 63 is anchored adjacent the service box by means of the cable plate 44 by removing the U-bolts 49 from the plate 44 and placing the wire 63 in the groove 47 where it is held by means of the U-bolts 49 replaced in the apertures 51. It may be noted that the raised portion 48 of the cable plate 44 provides a more positive gripping relationship between the gripped portion of the wire 63, the clamps 52 and the cable groove 47 by extending the groove 47 out of direct alignment with the clamps 52. It may be further noted that the channel 37 is now in grounded relationship to the messenger wire 63.

The conductors 62 are mounted in electrical relationship with the service box by removing the cover 55, removing the nut portion of the bifurcated bolt 34, and removing a portion of the insulation on the conductors 62 and inserting one of the conductors in the channels 9 and 10 and adjacent the terminal head 32 where the one conductor is held by means of the bifurcated bolt 34 in electrical relationship with the bus bar 24. The other conductor is inserted in the channels 11 and 12 and adjacent the head 30 in the manner described with reference to the terminal head 32. The cover 55 is replaced, thereby protecting all live connecting parts. It may be noted that it is not necessary to sever the conductors 62 but only remove the insulation therefrom in order to make a quick, easy and positive electrical connection with the service box.

The box is now in operative position to provide a plurality of three wire service drop connections for a corresponding plurality of electrical consumers not shown.

A three wire service drop 69 is illustrated in Fig. 3 comprising a conductor 70 grounded on the channel 37 at one of the slotted portions 37A and two conductors 71 extending through the apertures 23 and held in electrical relationship in the terminals 28 by means of the screws 29. The service drop is dead ended to the messenger wire 63 or any other suitable support as for example the pole 65, by means of a well known type of flexible cable anchor 72.

It may be noted that further service drops may be provided in the vicinity of the pole 65 by simply removing the cover 58 and inserting the necessary conductors in the proper terminals 28 and securing the conductors therein by means of the screws 29 tightened in place by means of a screw driver and grounding the third wire at a convenient slotted portion 37A on the channel 37 by means of a properly arranged bifurcated bolt not shown.

Figs. 4 and 5 show a modified form of service box comprising a housing 73 having a rear wall 74, side walls 75 and upper and lower walls 76 and 77 respectively. Conductor channels 78 and 79 extend transversely of the housing 73 at each end thereof and enlarge intermediate the side walls 75 into corresponding compartments 80 and 81.

Longitudinal compartments 82 and 83 disposed between and normal to the channels 78 and 79 extend into the compartments 80 and 81 respectively and are separated from each other by means of a partition 84. It may be noted that one end of each compartment 82 and 83 is separated from the adjacent channels 79 and 78 by the partitions 85 and 86 respectively. It may be further noted that the compartments 82 and 83 are in non-communicating relationship with each other because of the partitions 84, 85 and 86. Openings 87 are provided in opposite ends of the partition 84 and extend through the wall 74 and terminate centrally of the supporting surfaces 88. The openings 87 are adapted to receive bolts, not shown, whereby the service box may be mounted on the channel iron 37 in the manner described with reference to Fig. 1.

The compartments 82 and 83 are provided with apertures 89 each of which extend downwardly at an angle through the wall 75. The compartments 82 and 83 are notched outwardly at 90 adjacent each opening 89 and notched at 91 into the partition 84.

Elongated terminal members 92 comprising a series of connector portions 93 and a terminal head 94 slotted at 95 to receive a bifurcated type of bolt, not shown, are mounted in the corresponding compartments 82 and 83 by means of screws 96 extending through and counter-sunk in the rear wall 74 as shown. The connector portions are apertured therethrough at 97 and extend into the notched portions 90 adjacent the conductor openings 89 and extend upwardly and rearwardly into the notched portions 91. Each connector portion 93 is provided with opposed pairs of threaded openings 98, one pair of which is shown receiving the screws 99 to hold the line conductor 71 in the wire receiving aperture 97.

The terminal head portion 94 of each terminal member 92 extends into a corresponding compartment 80 and 81 where the secondary line conductors 62 are electrically secured in the manner described with reference to Fig. 1.

It may be noted that the terminal members 92 are interchangeable from one compartment to the other, it being only necessary to mount the screws 99 on the proper side of the wire receiving openings 97 in the screw openings 98.

A cover plate, not shown, may be mounted on a screw means, not shown, which may extend through the apertures 87 in the manner described with reference to Fig. 2 except that the cover may be made in a single piece and may extend between the raised portions 102 on the walls 76 and 77 and flush with the side walls, 75 thereby protecting the electrical connections within the box against direct weathering and mechanical damage.

The modified box is mounted in electrical relationship to a secondary messenger wire type of line construction in the manner described with reference to Fig. 3 except that the conductors 62 will be spaced apart a greater distance than shown in Fig. 3 in order to be mounted in the corresponding channels 78 and 79 as shown in Fig. 4.

It may be noted that the service boxes hereinbefore described may also be mounted in electrical relation with a standard type of two wire secondary transmission line.

When the service box is used on a two wire secondary system the cable plate 44 is not needed. Leads are tapped from the secondary wires and connected to the corresponding terminal heads 30 and 32 or 94 by means of solderless connectors. Service drops are connected to the terminal portions in the manner described with reference to Fig. 3 except that the ground wire 70 is eliminated.

It is apparent from the foregoing description that the objects of this invention have been attained by providing for a secondary transmission line a service box comprising a housing having a plurality of compartments, each being in communication with the exterior of the housing and having bus bars mounted therein, a portion of each bar being adapted for connection with a secondary conductor and the remaining portion of each bar being adapted to provide terminal connections for service drop conductors, the various connections being made independently of the other.

It is further apparent that a service box has been provided having a mounting means associated therewith and adapted for mounting the service box in operative relationship to a messenger wire type of secondary transmission line.

A further object has been accomplished by providing a secondary service box having compartments in noncommunicating relationship to each other and having interchangeable terminal members disposable in either of the compartments.

I claim:

1. A secondary service box made of an insulating material and comprising channels extending transversely thereof and open on each side of said box, adjacent terminal compartments having a common dividing wall and each provided with a side and communicating with one of said channels, the opposed faces of the dividing wall and the side walls having offset and inset portions, said side walls being provided with apertures extending to the exterior of said box and in an angular direction relative to said channels, and elongated terminals each positioned in one of said compartments and extending into a corresponding channel and having a series of tubular conductor clamps adjacent said apertures and in axial alignment therewith, and said elongated terminals being constructed for interfitting engagement with the offset and inset portions of the common dividing wall and side walls.

2. A secondary service box made of an insulating material and comprising channels extending transversely thereof and open on each side of said box, adjacent terminal compartments having a common dividing wall and each provided with a side and communicating with one of said channels, the opposed faces of the dividing wall and the side walls having offset and inset portions, said side walls being provided with apertures extending to the exterior of said box and in an angular direction relative to said channels, and elongated terminals each positioned in one of said compartments and extending into a corresponding channel, each terminal having a series of tubular clamping portions adjacent said apertures in axial alignment therewith and having terminal clamping means associated in integral relation with said extended portion, and said elongated terminals being constructed for interfitting engagement with the offset and inset portions of the common dividing wall and side walls.

3. A secondary service box made of an insulating material and comprising spaced channels extending transversely thereof, said channels being adjacent one end and open on each side of said box, adjacent terminal compartments having a common dividing wall and each provided with a side and communicating with one of said channels and extending normally to and in the same direction from said channels, the opposed faces of the dividing wall and the side walls having offset and inset portions, said compartments being apertured downwardly through each of said sides to the exterior of said box, conductor means each positioned in one of said compartments and extending into a corresponding channel and having a series of tubular conductor clamps adjacent said apertures and in axial alignment therewith, and the conductor means being constructed for interfitting engagement with the offset and inset portions of the common dividing wall and side walls.

4. A secondary service box made of an insulating material and comprising spaced channels extending transversely thereof, said channels being adjacent one end and open on each side of said box, adjacent terminal compartments having a common dividing wall and each provided with a side and communicating with one of said channels and extending normally to and in the same direction from said channels, the opposed faces of the dividing wall and the side walls having offset and inset portions, said compartments being apertured downwardly through each of said sides to the exterior of said box, conductor means each positioned in one of said compartments and extending into a corresponding channel and having a series of tubular conductor clamps adjacent said apertures and in axial alignment therewith, terminal clamping means associated with said extended portion, whereby line conductors may be held in electrical relation therewith in said channels, and the conductor means being constructed for interfitting engagement with the offset and inset portions of the common dividing wall and side walls.

5. A secondary service box made of an insulating material and comprising spaced channels each extending transversely of said box and adjacent an end thereof, said channels being open on each side of said box, terminal compartments each communicating with one of said channels and extending normal to said channels, said compartments being apertured to the exterior of said box and in noncommunicating relationship with each other, conductor means each positioned in one of said compartments and extending into a corresponding channel and having a conductor clamp in said compartment adjacent said aperture.

6. A secondary service box made of an insulating material and comprising channels extending transversely thereof and open on each side of said box, adjacent terminal compartments having a common dividing wall and each provided with a side and communicating with one of said channels, the opposed faces of the dividing wall and the side walls having offset and inset portions, said compartments being apertured downwardly through each of said sides to the exterior of said box, elongated terminals each positioned in one of said compartments and extending into a corresponding channel and having a series of tubular conductor clamps adjacent said apertures and in axial alignment therewith, said elongated terminals being constructed for interfitting engagement with the offset and inset portions of the common dividing wall and side walls, a first cover for said compartments and a second cover for said channels, holding means including bolts passing through said box and covers adapted to anchor said box in mounted position and hold said cover portions in closed position and means threaded on said bolt for engagement with said covers.

7. A unitary bus bar comprising an elongated conductive member provided with a slotted terminal head, said head being adapted to receive a bifurcated bolt whereby the intermediate length between the suspended portions of a conductor wire may be received in electrical relation therewith, and spaced tubular conductor clamps integral with said bus bar and providing an opening into said bar at an angle relative to the longitudinal axis thereof.

8. A secondary service box made of an insulating material and comprising channels extending transversely thereof and open on each side of said box, terminal compartments each communicating with one of said channels, said compartments being in noncommunicating relationship with each other and apertured to the exterior of said box, identical terminal members mountable in either of said compartments and having a terminal head extending into a corresponding channel and having a conductor clamp adjacent said aperture.

9. An insulating secondary service box comprising a pair of substantially parallel channels extending transversely and open at opposite sides thereof, a pair of elongated, substantially parallel compartments normal to said channels and each communicating with one of said channels, each of said compartments having a plurality of apertures to the exterior of said box, in combination with a supporting base, a pair of covers, one of which closes said channels laterally thereof and the other of which closes said compartments, bolts extending through said base, box, and covers, and positioned between said channels and compartments, and means threaded on said bolts for engagement with said covers, whereby said covers may each be individually removed without releasing said box from said base.

10. A secondary service box made of an insulating material and comprising channels extending transversely thereof and open on each side of said box, terminal compartments each communicating with one of said channels, said compartments extending between said channels in normal relationship thereto and apertured to the extension of said box, interchangeable terminal members each positioned in one of said compartments and extending into a corresponding channel and having a conductor clamp adjacent said aperture.

MICHAEL RUGGIERI.